United States Patent [19]

Auer, Jr. et al.

[11] Patent Number: 4,617,662
[45] Date of Patent: Oct. 14, 1986

[54] VITAL MESSAGE SYSTEM WITH UNIQUE FUNCTION IDENTIFICATION

[75] Inventors: John H. Auer, Jr., Fairport; Henry C. Sibley, Adams Basin; Leslie C. Stewart, Rochester, all of N.Y.

[73] Assignee: General Signal Corporation, Stamford, Conn.

[21] Appl. No.: 560,669

[22] Filed: Dec. 12, 1983

[51] Int. Cl.$^4$ .............................................. G06F 11/08
[52] U.S. Cl. ...................................... 371/25; 371/53; 371/67
[58] Field of Search ........................ 371/22, 25, 53–54, 371/65, 67, 70, 72; 364/200 MS File, 900 MS File; 340/500, 505, 514, 517–518, 825.06

[56] References Cited

U.S. PATENT DOCUMENTS

| | | | |
|---|---|---|---|
| 3,711,830 | 1/1973 | Van Der Sel | 371/53 X |
| 4,045,771 | 8/1977 | Loreck | 371/70 X |
| 4,090,173 | 5/1978 | Sibley | 340/146.1 BA |
| 4,270,168 | 5/1981 | Murphy et al. | 364/200 |
| 4,368,534 | 1/1983 | Sibley | 371/53 |
| 4,428,076 | 1/1984 | Schvon | 371/22 X |
| 4,454,600 | 6/1984 | Le Gresley | 371/25 |
| 4,471,486 | 9/1984 | Sibley | 371/53 |
| 4,498,174 | 2/1985 | Le Gresley | 371/25 X |
| 4,513,419 | 4/1985 | Small | 371/25 X |

Primary Examiner—Gary V. Harkcom
Attorney, Agent, or Firm—Pollock, Vande Sande & Priddy

[57] ABSTRACT

A vital communication system connects an input location to an output location using a non-vital communication link. In addition to transmitting, from the input location to the output location, a word with a bit dedicated to each different input, a system check word is transmitted. Each different input is assigned a unique multi-bit value, and the system check word comprises a linear combination of the unique multi-bit values for each of the inputs in a given binary state. Thus, there is a relationship between the transmitted words with bits dedicated to each input line and the system check word. At the output location, this correspondence is checked for. In addition, a further check is employed which first produces an output check word made up of a linear combination of the unique names for each output which are not in the given binary state. This output check word is then linearly combined with the received system check word. In the absence of a failure, the result of this linear combination of the output check word and the system check word should be constant regardless of the particular condition of different inputs and outputs, so long as the output and inputs actually correspond. Apparatus is provided to check for this constant result.

27 Claims, 16 Drawing Figures

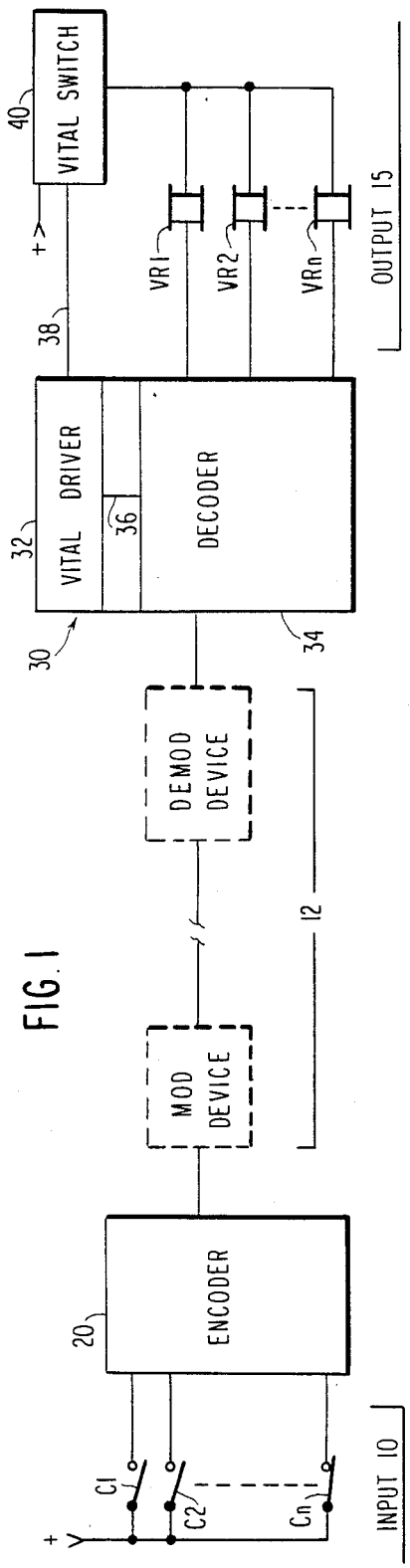
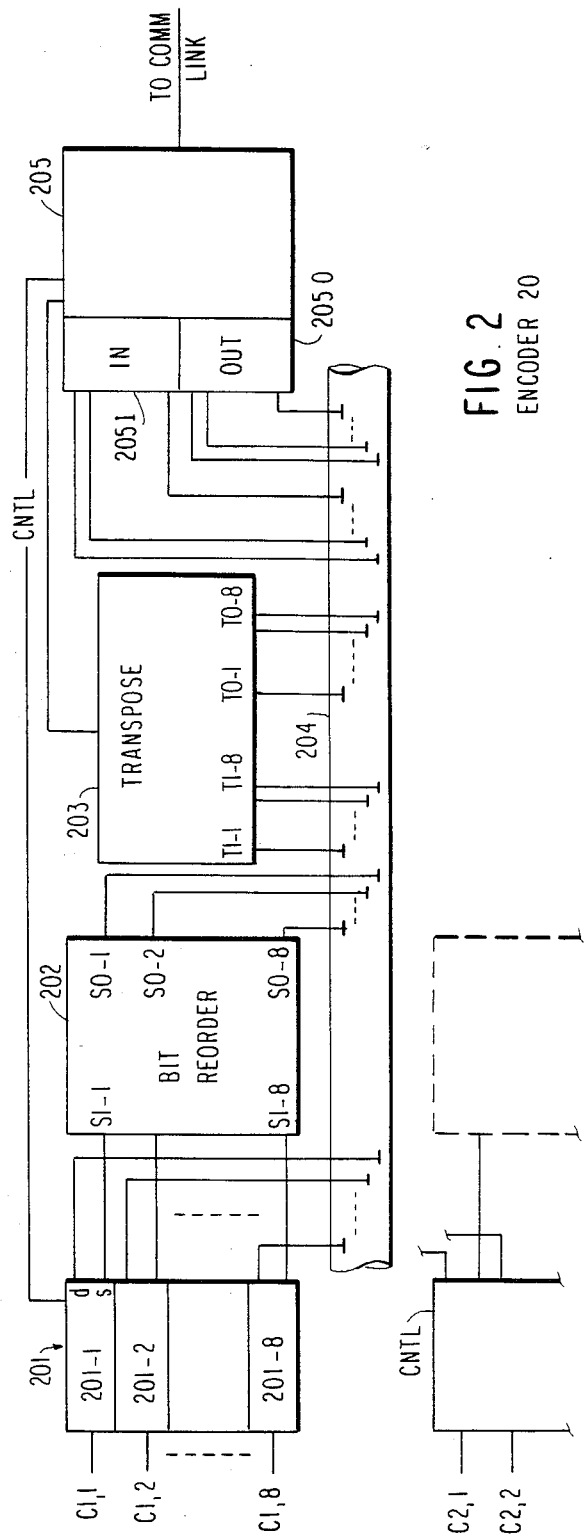
FIG. 1
FIG. 2 ENCODER 20

FIG. 4

TIME →
TEST WORDS

|     | 0  | 1  | 2  | 3  | 4  | 5  | 6  | 7  |
|-----|----|----|----|----|----|----|----|----|
| b0  | A  | B  | C  | D  | E  | F  | G  | H  |
| b1  | I  | J  | K  | L  | M  | N  | O  | P  |
| b2  | Q  | R  | S  | T  | U  | V  | W  | X  |
| b3  | Y  | Z  | A1 | B1 | C1 | D1 | E1 | F1 |
| b4  | G1 | H1 | I1 | J1 | K1 | L1 | M1 | N1 |
| b5  | P1 | Q1 | R1 | S1 | T1 | U1 | V1 | W1 |
| b6  | X1 | Y1 | Z1 | A2 | B2 | C2 | D2 | E2 |
| b7  | F2 | G2 | H2 | I2 | J2 | K2 | L2 | M2 |

FIG. 5

TIME →
BIT REORDERED TEST WORDS

|   | 0  | 1  | 2  | 3  | 4  | 5  | 6  | 7  |
|---|----|----|----|----|----|----|----|----|
| 0 | F2 | G2 | H2 | I2 | J2 | K2 | L2 | M2 |
| 1 | A  | B  | C  | D  | E  | F  | G  | H  |
| 2 | I  | J  | K  | L  | M  | N  | O  | P  |
| 3 | Q  | R  | S  | T  | U  | V  | W  | X  |
| 4 | Y  | Z  | A1 | B1 | C1 | D1 | E1 | F1 |
| 5 | G1 | H1 | I1 | J1 | K1 | L1 | M1 | N1 |
| 6 | P1 | Q1 | R1 | S1 | T1 | U1 | V1 | W1 |
| 7 | X1 | Y1 | Z1 | A2 | B2 | C2 | D2 | E2 |

FIG. 6

TIME →
STATE WORDS

|   | 0  | 1 | 2 | 3 | 4  | 5  | 6  | 7  |
|---|----|---|---|---|----|----|----|----|
| 0 | F2 | A | I | Q | Y  | G1 | P1 | X1 |
| 1 | G2 | B | J | R | Z  | H1 | Q1 | Y1 |
| 2 | H2 | C | K | S | A1 | I1 | R1 | Z1 |
| 3 | I2 | D | L | T | B1 | J1 | S1 | A2 |
| 4 | J2 | E | M | U | C1 | K1 | T1 | B2 |
| 5 | K2 | F | N | V | D1 | L1 | U1 | C2 |
| 6 | L2 | G | O | W | E1 | M1 | V1 | D2 |
| 7 | M2 | H | P | X | F1 | O1 | W1 | E2 |

STATE WORD TABLE BIT POSITION

| VSW # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 32 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 33 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 34 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 35 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 36 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 37 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 38 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 39 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 40 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG. 16

VITAL MESSAGE SYSTEM WITH UNIQUE FUNCTION IDENTIFICATION

TECHNICAL FIELD

The present invention relates to the field of communication, and more particularly to providing an effectively vital communication system in which the communication link itself is non-vital.

CROSS-REFERENCE TO RELATED APPLICATIONS

The following description makes reference to a number of commonly assigned, previously filed applications, the subject matter of which is incorporated herein by this reference. These referred to applications include:

1. Sibley U.S. patent application Ser. No. 273,299, filed June 15, 1981, now U.S. Pat. No. 4,471,486;
2. Rutherford U.S. patent application Ser. No. 550,693, filed Nov. 10, 1983;
3. Hoelscher U.S. patent application Ser. No. 550,430, filed Nov. 10, 1983;
4. Sibley U.S. patent application Ser. No. 550,431, filed Nov. 10, 1983;
5. Sibley et al U.S. patent application Ser. No., 241,819 filed Mar. 9, 1981, now U.S. Pat. No. 4,485,435.

BACKGROUND ART

While the present invention is broadly directed at communication systems, it is more specifically directed at vital communication systems. Vital communication systems communicate vital data in such a way that the data retains its "vitalness" at the output of the communication system.

The term vital implies that the data has been processed to guard against generating data which, even in the presence of a failure, is not safe. The apparatus and techniques which are employed to generate the vital data plays no part in the present invention; it is the purpose of the present invention to communicate that data, from a point at which it is generated, to a remote point. It should be apparent that a vital communication link is all that is needed. However, vital communication links are not readily available. It is therefore the purpose of the present invention to transport the vital data over a non-vital communication link, such that at the output of a non-vital communication link, the data retains its "vitalness". While prior developments in this area have met with success, see U.S. Pat. No. 4,090,173 and prior copending Sibley application Ser. No. 273,299, now U.S. Pat. No. 4,471,486 entitled "Vital Communication System for Transmitting Multiple Messages", both assigned to the assignee of this application, we believe improvements in the area of maintaining high security against failures can be obtained.

One technique to retain the "vitalness" of the data being transmitted is to transmit, in addition to the message itself, redundant information. While the probability of corrupting the data itself may be at a given level, the probability that the corrupting influence will not only corrupt the data but the redundant information in a compensating fashion is lower. However, there are a variety of techniques for adding redundant information.

Transmitting vital information over a non-vital communication link requires, in addition to the transmission function itself, additional functions of checking or verification, and these procedures are carried out both at the input and output end. The checking or verification procedures are designed to check or verify that at the input end, the input sensing has been accomplished in a vital fashion, or in other words, to answer the question have we correctly sensed the input data?; and at the output end, we must check or verify that the received data is consistent with the redundant information (this detects any errors in the non-vital communication), and we must also check or verify that the output of the communication system properly reflects the data which has been received, i.e. guard against errors in the output function.

Furthermore, at the input end, once we have satisfied ourselves that the data has been properly sensed, it must be encoded (this is where the redundant information is added) and we must check and/or verify that the encoding is properly performed. A complementary function at the receive end is the necessity for decoding the information, i.e. stripping out the redundant information, and checking and/or verification is also required to assure that this has been effected without error.

Efficiency in connection with this processing (verification that sensing, encoding, decoding and output have all been performed correctly) relates to the time required for effecting the functions. Desirably, the time required to effect these functions is minimized, without at the same time increasing the probability of unsafe failures.

SUMMARY OF THE INVENTION

It is therefore one object of the present invention to provide a vital communication system employing a non-vital communication link which maintains the vitalness of the information from input to output without paying a penalty for transmitting too much redundant information. It is another object of the present invention to provide a system such as recited above, which reduces the time spent in processing at the input and output ends of the system.

One improved area lies in input sensing. In the prior patent and application, cited above, processing to verify correct sensing at the input end included a port check. The port check was included to ensure that the input port was capable of properly reading its inputs. The port check thus necessitated processing (and corresponding amounts of time) which was not devoted to actually sensing the inputs. Described broadly, the port test (which was accomplished in a time multiplexed manner, interspersed with data sensing) placed a predetermined pattern on the input, sensed the input and compared it to ensure equality. To comply with the requirements for cycle checking, the pattern applied at the input tool on a variety of forms, all of which were checked.

In contrast, the communication system disclosed herein does not include a port check. Rather, a predetermined number of different bit patterns (vital test words) are applied to the circuits (or input lines) whose conditions are to be sensed. A circuit (or input line) which is in one binary state (closed or energized or on) will return to the sensing apparatus, a corresponding bit, e.g. either identical to the applied bit pattern or an inverted replica of the applied bit pattern. Safety is enhanced if the system is arranged to repeat the bit pattern in inverted form for the case of the input in one binary state. On the other hand, an input line which is in the other binary state (open or de-energized or off) will return a null bit pattern to the sensing apparatus. The sensing apparatus includes a transposition device such that N words, each M bits long, are transposed into M words, each N bits long. Each circuit (input line) being sensed only provides a different bit to each of the N words. The transposed M words have the characteristic that each is associated with a different one of the circuits (input lines) being sensed.

Applying a multi-bit pattern to each circuit (input line) to be sensed has the advantage that if properly chosen, cycle checking is automatically taking place, since the multi-bit pattern can be arranged to exhibit both binary states. In order to apply the bit patterns, the apparatus generating those bit patterns must obviously have a source from which they can be withdrawn. Transposing the N sensed words, each M bits long, into M words, each N bits long, ensures that the apparatus does not have available to it (in storage) any bit patterns which can be erroneously substituted for the sensed pattern, i.e. the appropriate pattern is only available if the apparatus works correctly. Furthermore, using multi-bit patterns of sufficient length ensures that the pattern returned from each sensing circuit can be unique. This guards against the possibility that the pattern returned from one sensing circuit will be erroneously accepted as the pattern returned from another. This sensing is similar to the input sensing described in the co-pending application of Rutherford filed Nov. 10, 1983, Ser. No. 550,693.

One disadvantage of sensing the binary condition of an input line with a multi-bit pattern which is spaced in time is the distinct possibility that the input line could change state during the sensing operation. Since the pattern applied to each of the input lines whose condition is to be sensed may be unique, any such occurrence could result in the production of a sensed bit pattern which is not what is expected. If corresponding information were to be transmitted, it could fail at the receiving end and perhaps unnecessarily interrupt normal communications. In the referred to Rutherford application, after input sensing is accomplished, a test is effected on the sensed bit pattern, and if the results of that test indicate that the bit pattern has been garbled, then the sensed bit pattern is not employed. We accomplish a similar result through a different technique.

More particularly, the transposed sensed bit pattern (which we will hereinafter term a vital state word) is obtained by providing a group of sense circuits, one sense circuit for each input line in a group, and driving all the sense circuits in parallel with a plurality of vital test words. Because each sense circuit is driven by only one bit in each vital test word, the resulting sensed patterns must be, and are, transposed to produce vital state words, wherein each vital state word corresponds to a different input line. Since we are effecting a technique to determine garbling because of the change in state of an input line, we employ, in addition to the vital test words, what are hereinafter referred to as direct test words. Each bit in a direct test word corresponds to a different input line. The result of driving a group of sense circuits with a direct test word is a direct state word, again where each bit of the direct state word corresponds and can be mapped to a particular input line. We intersperse direct test words during the course of providing our vital test words. We examine the resulting direct state words. If the direct state word shows that an input line remains in an "on" condition throughout this testing, then we will use the corresponding vital state word, otherwise the vital state word is not used.

In the most direct arrangement, all direct test words are made up of null strings. In this event, the direct state word will have a one bit corresponding to each on input line, and otherwise a zero bit. Of course, in the alternative we could use direct test words made up of all one bits, in which event on circuits would be identified by direct state words with corresponding zero bits. While it is simpler to use direct test words which are made up of all zeros or all ones, that is not essential to the invention, and we could use direct test words made up of a mixture of ones and zeros. In this case, one could not determine from a direct state word by inspection the condition of the corresponding circuit, since one would also have to known whether the corresponding bit in the direct test word was a one or a zero. However, this can be handled with a simple intermediate step.

Assuming that the direct test word is made up of a null string, then if an input line remains "on" throughout the testing, all of the correspnding bits in all of the direct state words will be a one (because of the characteristic of the sense circuit and the fact that the direct test words are all zeros). Under this assumption, any input line which returns all one bits in each of the direct state words has been maintained in an on condition throughout the vital testing. Correspondingly, if any direct state word returns a zero bit, we assume that the corresponding input line was in a "off" condition. As will be explained below, the vital state word from any input line which is at any time off, is not used at the encoder.

Thus at the conclusion of input sensing, we have plural direct state words, and we AND all of the direct state words to produce a master state word. This master state word is one word which will be transmitted and will be referred to as the direct message. Each bit in the matter state word (or the direct message) reflects our estimate of the condition of the associated input line, that is, we estimate the input line to be in an on condition only if the master state word includes a one bit in the corresponding bit position.

The vital test words are chosen so that the resulting vital state word for any input line is unique (relative to any other input line in the group being tested, and unique from any other input line in the same system, which may include a plurality of groups). The vital test words are selected to that the number of bits in the resulting vital state word is sufficient to provide for this uniqueness as well as providing for additional levels of uniqueness as follows. For every bit in the master state word which indicates that the corresponding input line is in a "on" condition, we select the corresponding vital state word and linearly combine all the vital state words so selected for any one group. The result, which we will term a check word, is firstly unique from any vital state word, and is also unique from any other check word which will be produced by similar processing in a different condition of the input lines in the group. Accordingly, we can tell from the check word itself (not necessarily by inspection) which input lines have been estimated to be in an "on" condition, and which input lines have not been estimated to be in an "on" condition. This characteristic will be used at the decoder for checking purposes. One example of this linear combining is an exclusive OR function.

The bit length of the vital state words and the check words (the bit lengths of which are necessarily equal)

are selected so that there are additional bit combinations which have not yet been used. A group may be assigned a unique system ID, and that system ID may be one or more bit patterns which are unique from the system ID of any other system. Once we have derived the check word for the group, we linearly combined the group's check word with the group's system ID, and this produces a system check word for the system.

This processing completes the encoding operation since we merely concatenate the direct message (the master state word) with the system check word, associated with a start of frame bit pattern and transmit to the decoder, as the message, the aforementioned words.

For a system with plural groups, we linearly combine all the check words to produce a master check word and then combine it with a system ID to produce a system check word. We concatenate a direct message from each group with the system check word and transmit the concatenated words.

At the decoder, firstly the framing bit pattern is removed, leaving a direct message for each group and the system check word. The first message is used to select the condition of the corresponding output. The decoder has an output bit position for each input line, and each output bit position is controlled by a different bit of the direct message. The decoder first checks the correspondence between the direct message and the system check word. This is effected by selecting (from a table) the NOT STATE Words, the complement of the state words which were used in producing the check words at the encoder. The words are to be used art identified by the direct message. The selected words are linearly combined with the complement of system check. The result should be SYSTEM ID, a constant for each system. If the message words do pass this test, then the message is accepted. The output bits are controlled to mirror the direct message.

As indicated above, we want to effect a check at the output to determine that we have actually controlled the outputs in the fashion dictated by the message. To do this, the output bit positions are then sensed virtally, using absence of current detectors, see the co-pending application of Hoelscher, filed Nov. 10, 1983 for a detailed description of these devices. The absence of current detectors return the inversion of the sensing bit pattern if the output is off (not on), otherwise a null bit pattern is returned. In this fashion, we generate vital state words at the decoder. We linearly combine the vital state words selected by the port mask (the direct message) to produce an output check word. We effect this function for all groups. We then linearly combine the output check words from all groups and linearly combine with the received system check word.

The received system check word is the linear combination of certain vital state words (for on inputs) and SYSTEM ID. At the decoder, we use the direct message to identify off ports, and linearly combine the corresponding vital state words to produce the output check word. One set of ports (the on ports at the input) generated system check. In the absence of a failure, all other ports contribute at the decoder to the output check word. We then combine system check and output check words. The result is a constant in the absence of a failure, and is used as a check as will be explained below.

Accordingly, the invention provides a method of encoding the binary state of a plurality of input lines comprising the steps of:

storing a direct state word with a bit dedicated to and representing the state of each of said input lines, providing a unique multi-bit value for each of said input lines, linearly combining a multi-bit value for an input line in a given state with the multi-bit value for each other input line in said given state to form a check word, and using said direct state word and said check word to represent the state of said input line.

The invention also provides a system for sensing the binary condition of plural input lines comprising:

a plurality of sense circuits, equal in number to the number of input lines, each sense circuit including an input terminal connected to a corresponding input line, a drive terminal, a sense output terminal, means for producing, at said sense output terminal a signal if said input line is in one binary condition and for otherwise producing a null sense output regardless of the drive input, a multi-conductor bus with at least a separate conductor for each input line in a group of input lines, first connector means for connecting conductors of said bus to different drive terminals of said group and second connector means for connecting conductors of said bus to different sense output terminals of said sense circuits, transposing means responsive to a control signal for transposing a time sequence of bit parallel, word serial, words on said bus to a time sequence of bit serial, word parallel words, processor means for writing a time sequence of vital and direct test words to said bus and for controlling said transposing means to operate only in response to said vital test words, and including means to combine resulting vital state and direct state words to determine the state of said group of input lines.

The decoder or receiving location receives the direct message (with a word for each group) and a system check. Since, as has been described, there is a relationship between the system check and the bit patterns making up the direct message, the decoder can and does use this correspondence to check for errors in transmission. More particularly, based on the bit pattern in each direct message, complements of the corresponding vital state words are selected and linearly combined with each other. The result, when linearly combined with the complement of system ID and the received system check, should be a constant regardless of the contents of any of the words of the direct message. This relationship is checked for, and only if the test is passed, is the received information, that is the direct message and the system check, stored in a vital memory for later use.

Immediately, the direct message is applied to the output ports to control the condition of each bit position. Vital checking uses a vital sensing technique similar to that used at the encoder. More particularly, a sequence of vital test words are applied and a resulting pattern of vital state words is derived and stored. Those vital state words corresponding to a port which is actually on consists of a null pattern whereas those vital state words corresponding to a port which is actually off identify the port. Based on the port's condition (e.g. the direct message) vital state words corresponding to off ports are linearly combined with each other, and with system check to produce a recheck check word. The result should be a constant in the absence of an unsafe error. The reason for this is as follows.

As has already been described, the system check is made up by linearly combining vital state words (each uniquely identifying the corresponding bit position) so that the system check bears a correspondence to and is derived from a selected set of vital state words, namely those vital state words corresponding to ports which have been sensed as being in an on or energized condition. The vital state words derived at the decoder uniquely identify those ports which are actually off. The linear combination of the vital state words derived at the decoder then, uniquely identifies those ports at the decoder which are actually off. By linearly combining the system check with all the vital state words identifying off ports at the decoder, we should produce a result which is the linear combination of all identities, and therefore by necessity should be a constant regardless of the particular ports which are off and on. An unsafe failure is one in which a port that should be off is actually on. If this occurs, then the identity of that port will not be included in the linear combination of vital state words and thus the result of the linear combination will not be a constant. The decoder itself does not check for production of this constant recheck check word, rather the recheck check word is transmitted to the VRD. The VRD will, in the presence of the expected recheck check words, allow the outputs to become effective.

BRIEF DESCRIPTION OF THE DRAWINGS

The present invention will be further described in the following portions of the specification so as to enable those skilled in the art to make and use the same when that specification is taken in conjunction with the attached drawings, in which like reference characters identify identical apparatus and in which:

FIG. 1 is a overall block diagram of a communication system in accordance with the present invention;

FIG. 2 is a more detailed block diagram of the encoder 20 forming an element of the system shown in FIG. 1;

FIGS. 4–6 are useful in explaining the bit re-ordering and transposition operations;

FIG. 16 is an example of vital state word selection.

DETAILED DESCRIPTION OF A PREFERRED EMBODIMENT

Figure 3:
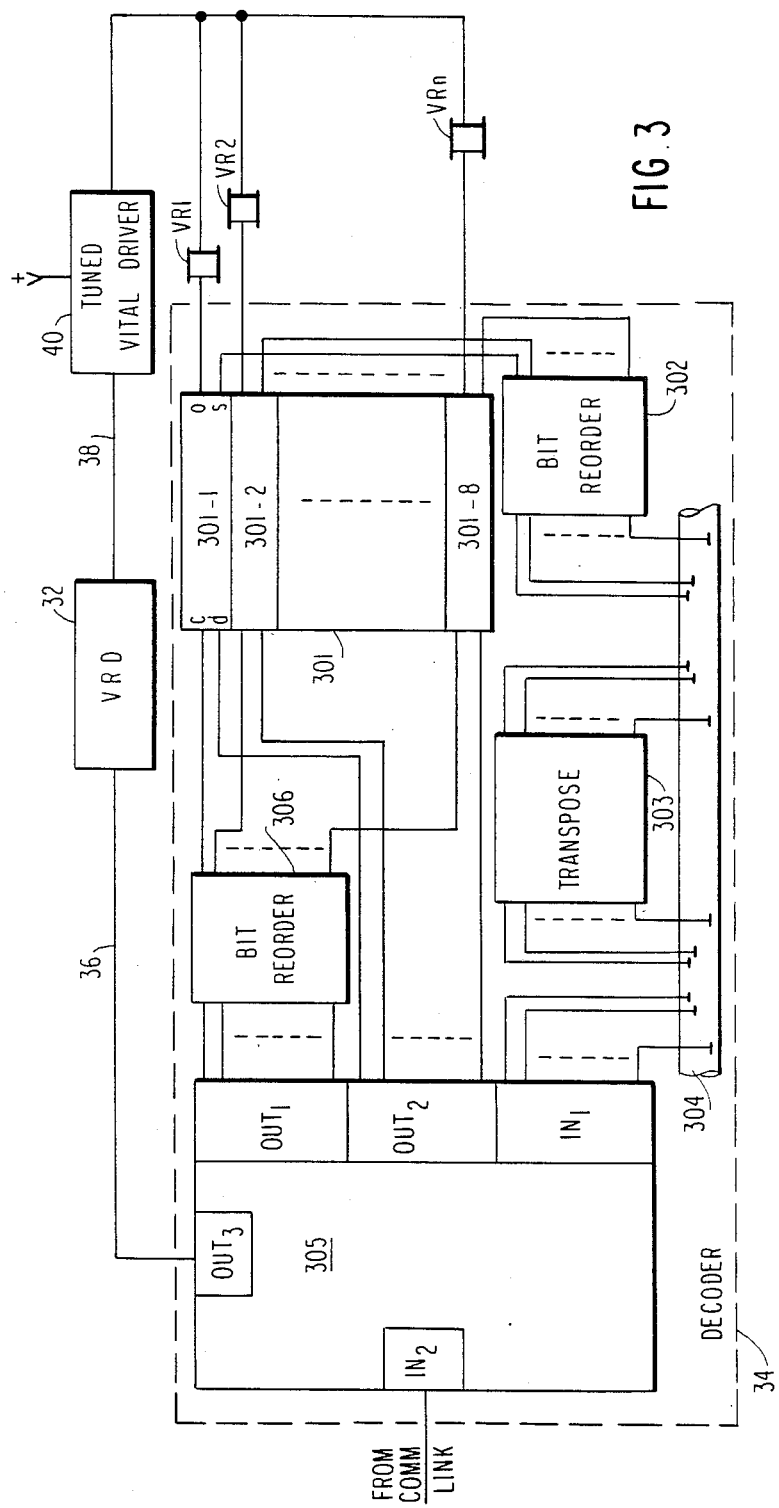
FIG. 3 is a detailed block diagram of the apparatus according to the present invention located at a receiving location.

As shown in FIG. 1, the vital communication system in accordance with the invention provides for the equivalent of a vital wired connection between a group of input lines or contacts C1–Cn, at an input location 10, and the corresponding plurality of vital relays VR1 through VRn at an output location 15. The communication system of the invention, as will be described below is a single direction system limited to one sending and one receiving location, e.g. the input 10 and the output 15. If bidirectional communications are necessary, a second communication system is provided for communicating in the reverse direction. As will be seen below, the communication system of the invention is designed to operate over any standard communication channel (cable, radio, fiber optics, etc.) at a bit rate selected by the user. The rate selected depends on the capacity of the channel and the amount of delay that can be tolerated. In an embodiment of the invention which has been constructed, the system will encode and transmit 32 functions (or inputs) with a maximum delay of 1 second. A message rate of 1200 baud is required. Lower message rates will increase delay; higher rates will not decrease delay, but may decrease the chance of transmission errors causing a system drop-out. The message, aside from communication overhead, includes a direct message with a bit for each input (or output) and a check word which may be 48 bits long. The message is continually repeated until the next message is made up.

Input and output modules were packaged in groups of 8 to allow our system to be configured for less than maximum capacity. A large number of system codes is provided allowing many systems (at up to four groups per system) to be operated over a multiplexed communication channel with no danger of unsafe operation due to cross talk.

Every function (an input line or an output bit position or relay coil) is assigned an identity. As will be seen below, during the encoding operation the input line identity is stored when the input is in its true or on state. The identity of an output bit position is stored if it is "off". The sense of the true designation is assigned in accordance with the vitalness of the information, e.g. an open contact or an off input line must never be interpreted as closed, because a closed indication could cause an output driver to be turned on in error, an energized output bit position must never be interpreted as "off" because such as indication would prevent detection of an output bit position that was actually "on" but not authorized to be on. Thus, by design, the identity of every input (or output) must be generated. Those which are on are generated at the encoder, all the remaining identities should be generated at the decoder.

The identity words (state words) are of sufficient length to satisfy two requirements:

1. Provide a unique function identity for all entities (input lines and output bit positions), 2. Provide unique system identities for all systems that may be multiplexed on one communication facility, 3. Provide protection against transient induced random values.

As will be discussed below, a vital state word has at least as many bits as there are functions in the system, a 32-function system (32 inputs and 32 outputs) has a minimum 32-bit vital state word. Longer bit lengths, e.g. 40–48 bits, are preferred.

Although there are many techniques which could be used to select suitable vital state words having the desired uniqueness, one simple but effective technique is described in FIG. 16. FIG. 16 shows a state word table for 40-bit words, e.g. with bit positions 0–39. We have shown several of the unique state words which have been numbered from 1 to 40. Each state word includes 39 zeros and a single 1 bit, each of the one bits being in a different location, so that each of the state words are unique. We can therefore correlate the position in which a one bit appears to a different input line. Thus, for a system with 32 input lines (4 groups), the resulting state word which is produced by a linear combination (for example exclusive OR'ing) of all those state words corresponding to input lines in an on or energized condition will instantly reveal which input lines are on, since the resulting check word will have a one bit in a particular location corresponding to each on or energized input line. That obviously requires only 32 of our vital state words. Words 33–40 can be used to identify at least one system out of eight.

Referring to FIG. 1, the input location 10 is shown as including a plurality of vital contacts or input lines C1–Cn. Each provides a separate input to an encoder 20, which forms one element of the inventive communication system. The encoder 20 provides a serial output stream to a communication facility 12. The communication facility 12 is represented in exemplary fashion in FIG. 1 as including a modulating device, a demodulating device and an interconnecting communication channel. As will be understood by those skilled in the art, the particular communication channel 12 which is illustrated in FIG. 1 can be replaced by a variety of various well known devices. The other element in the inventive system includes the receiving equipment 30 which interconnects the communication facility 12 with a like plurality of vital relay coils VR1–VRn, a different vital relay coil being provided for each input line. It is the purpose of the inventive system to provide the equivalent of a unique hard wired connection between the input lines C1–Cn and the corresponding vital relay coil VR1–VRn.

The receiving equipment in accordance with the invention includes a decoder 34 which directly responds to the output of the communication channel 12 and has an output bit position for each vital relay coil VR1 through VRn. In addition, the decoder 34 has another output which is connected via path 36 to a vital driver (or VRD) 32. The function of the vital driver 32 will become clear hereinafter, however it has an output via path 38 to a vital switch 40. The vital switch 40 is arranged to provide power to each of the vital relay coils VR1 through VRn under an appropriate circumstances, more particularly, when it receives an appropriate signal on the path 38. Accordingly, there are two conditions for energization of any vital relay coil, a first condition is that its corresponding output bit position in the decoder 34 carry an appropriate (low) potential, and the second necessary condition is that the vital switch 40 provide a corresponding (high) potential. The latter condition will be satisfied only in the event that the decoder 34 supplies, over path 36, an appropriate signal to the vital driver 32. It should be apparent that the particular potential supplied by the vital switch 40 and by the decoder 34 can be reversed (the vital switch 40 supplying the low potential and the output bit position of the decoder 34 supplying the high potential, if desired). Other arrangements are also possible.

The vital driver 32 may take the form described in more detail in the co-pending Sibley application filed Nov. 10, 1983, Ser. No. 550,431 and assigned to the assignee of this application. While FIG. 1 shows a single system, the communication link 12 may support multiple independent systems through the use of conventional multiplexing techniques.

THE TRANSMITTING LOCATION

FIG. 2 is a block diagram of a typical encoder 20. Before describing FIG. 2 in detail, a brief word is in order about input groups. For convenience, in an embodiment actually constructed, we grouped a plurality of input lines, 8 input lines per group, and treated each group as an entity. The selection of 8 input lines per group is convenient, for many processors employ 8-bit words, but it should be apparent that different numbers of input lines in a group can be accommodated within the spirit of the invention.

Each input line can be in one of two conditions. It can be on, closed or energized (equivalent terms) or on the other hand, it could be off, open or de-energized. Typically, as will be described, in one of these conditions, the input line has a voltage in excess of an established threshold.

FIG. 2 illustrates a group sense element 201, including a different sense circuit 201-1 through 201-8, for each input line in the group, a bit re-ordering element 202, a transpose element 203, a multi-conductor bus 204 and a processor (which may be a microprocessor) 205.

The group sense element 201 includes a dedicated sense circuit for each of the input lines, and as shown in FIG. 2, group 1 includes input lines C1,1 through C1,8 (where the 1 is a group identification and the second digit identifies an input line or circuit within the group) and thus the group sense element 201 has sense circuits 201-1 through 201-8. Each sense circuit, such as sense circuit 201-1 has an input connected to the corresponding input line and a drive terminal d which is connected to one of the conductors in the bus 204. Each sense circuit includes an output terminal s coupled to an input terminal of a bit re-ordering element 202. Thus the bit re-ordering element 202 has a different input (SI-1 through SI-8) connected to each of the sense terminals of sense circuits in the group sense element 201. The bit re-ordering element 202 has a like number of output terminals SO-1 through SO-8, each connected to a different conductor in the bus 204.

The sense circuit has the following characteristic. If the associated input line is in an "on" condition, then the sense terminal s will repeat, in inverted form, a bit pattern applied at the drive terminal d. Thus, if the input line C1,1 is in an "on" condition, and the bit pattern 010 is applied to the d terminal of sense circuit 201-1, then the s terminal will produce the bit pattern 101. If, on the other hand, the associated input line is in an "off" condition, then the terminal s will provide a null or zero bit pattern regardless of the bit pattern applied at the d terminal. A more complete description of a suitable sense circuit is found in co-pending application of Hoelscher, filed on Nov. 10, 1983 or the Rutherford application Ser. No. 550,693.

The multi-conductor bus 204 includes at least a different conductor for each input line in a group (and hence for each sense circuit in a group sense element 201). Since each different sense circuit has a drive terminal d connected to a different conductor on the bus 204, if we present a test word on the bus 204, in bit parallel form, then each sense circuit "sees" the bit on a different one of the conductors. If we present a plurality of test words on the conductor 204, then each sense circuit will see a bit pattern which consists of concatenating a single bit from each word, namely that bit on the conductor which corresponds to and is connected to the drive terminal d of the sense circuit.

If each input terminal of the bit re-ordering element 202 were connected to the like output terminal, then a time sequence of test words (in bit parallel format) would produce a time sequence of sense words (again, in bit parallel format) on the bus 204, wherein each different conductor on the bus 204 could be mapped to a different input line. Because of the characteristics of the sense circuit, that conductor would display, in a time sequence, a bit pattern which was inverted with respect to the test words if the associated input line was "on", or a null bit pattern if the associated input line was "off". Our desire is to provide a plurality of state words wherein all the bits of any particular state word are associated with a particular input line. Therefore, we must somehow transpose the time sequence of bit parallel words on the conductor 204 to appear in bit serial format. This function is accomplished by the transpose element 203. A suitable transpose element 203 is more completely described in the co-pending Rutherford application, filed Nov. 10, 1983, Ser. No. 550,693.

However, for reasons which are more completely described in the Rutherford application, we do not connect corresponding inputs and outputs of the bit re-ordering element 202, but instead to provide a unique signature for each different group; we scramble the input and output connections in the bit re-ordering element 202 so that the input/output connections in each group are unique. Refer now to FIGS. 4-6 to see the effect of the arrangement thus far described.

FIG. 4 shows a matrix of test words, each test word is 8 bits long ($b_0$ through $b_7$). These test words are placed on the bus 204 by means which will be described hereinafter, in a time sequence as shown in FIG. 4. Thus, the first test word comprises bits A, I, Q, Y, G1, P1, X1 and F2 (it should be understood that we have used the designations A-Z, A1-Z1 and A2-M2 merely for purposes of identifying the different bit positions in the matrix, and in fact each of these bit positions either carries a zero or a one, as is conventional in the binary numbering system). Our test words include 7 additional words, as shown in FIG. 4, each presented in a word serial, bit parallel format. Because each sense circuit is associated with a single conductor of the bus 204, sense circuit 201-1 is presented with a time sequence of the bits A, B, C, D, E, F, G and H. In the course of input sensing, each driving pulse will produce a result of the sense terminal s which will either be the inversion of the drive pulse (0 for a 1 at d or a 1 for a 0 at d) if the associated terminal is "on", and all zero regardless of the bit pattern presented to the terminal d, if the associated input line is "off".

For purposes of description, we have assumed that the bit re-ordering arrangement in a particular bit re-ordering element 202 connects each input position SI to the next higher adjacent output (so that, for example, SI-1 is connected to SO-2, etc., and SI-8 is connected to SO-1). Thus, FIG. 5 shows a matrix illustrating the time sequential output of the bit re-ordering element 202. That is, SO-1 will see the time sequence F2-M2, since that is the sequence output by the sense circuit 201-8 and hence input to SI-8, which is, as we have said, connected to SO-1. Obviously there are many other signatures which can be provided and the one we have assumed is merely exemplary. To provide each group with a different 'signature', the arrangement of input/output connections of a bit re-ordering element in one group is different from that of other groups.

The transpose element, as we have said, transposes the word serial, bit parallel format and produces word parallel, bit serial. That is the output of the transpose element 203 produces a time sequence of state words on the bus 204 as shown in FIG. 6. Whereas the test words or re-ordered test words each carried a bit generated by a different one of the sense circuits (hence corresponding to a condition of different input lines), each of the state words has the characteristic that each bit in a state word represents the condition of a single input line. By referring back to FIG. 4, for example, we see that state word 0 (with bits F2-M2) represents the state of the eighth input line, C1,8. The reader can verify that each other state word includes bits derived from a single input line.

The bit length of each state word, as so far explained, is necessarily limited to the bit width of our conductor 204. However, as is explained in the co-pending Rutherford application, we can use more test words than there are input lines, twice the number of input lines, 3 times, etc. This will allow us to build up a state word which has twice as many bits as the number of input lines in a group, 3 times the number of bits as the number of input lines in a group, etc.

By now, at least part of the function of the processor 205 should be apparent. The processor has a multi-bit input port and a multi-bit output port. The processor 205 generates a time sequence of test words and applies them through the output port 205O to the bus 204. Through the control conductors 206 and 207, the processor enables the sense element 201 and/or the transpose element 203 to effect the described function. As a result, the processor can then accept, at its input port 205I, a sequence of state words, each state word representing a different input line. Because of the characteristic of the sense circuits, state words with a null value represent an "off" input line and state words carrying the true value of the identity of an input line represent an "on" input line. (The inversion of the sense circuit is handled by using vital test words which are formed by transposing the complement of the true words.)

This process takes some finite time, since it requires the presentation of multiple test words and we have to allow for the possibility that an input line changes its condition during sensing. This changed condition could result in a garbled state word which we want to guard against. To do this, we employ direct test words. These direct test words are applied by the processor 205 in the same fashion as the vital test words so far described, however they are not transposed by the transpose element 203. Thus, each bit in the direct state words, which results from the direct test words, represents a different input line. We actually use a plurality of direct test words interspersed with the vital testing. Only if the input bits in the direct state word indicate that the associated line remained "on" throughout the entire vital testing, is the vital state word used (as will be described). As a result of the plural presentation of direct test words, we have plural direct state words. These and AND'ed together to produce a master state word which will be used as described below.

FIG. 2 shows the bit re-ordering between the bus and the s terminals, so that conductors in the bus are connected to corresponding d terminals and the connection between the bus and the s terminals is 'scrambled'. Exactly the same result is produced by locating the bit re-ordering between the bus and the d terminals. In the latter event, each s terminal is connected to a corresponding conductor in the bus while the relationship between conductors of the bus and the connected d terminal is 'scrambled'. Thus, bit re-order element 202 can either be connected between the bus and the s terminals (as in FIG. 2) or between the bus and the d terminals (not illustrated).

When the state of an input line changes from off to on, its direct state bit is stored in a "aging" buffer (which, as will be described, is implemented in the processor 205). Since contact bounce in a relay can produce alternations between off and on for 50 to 75 milliseconds, we use the "aging" buffer to prevent responding to contact bounce. We do not use the on state of a direct state bit until it has remained unchanged for a delay time imposed by the aging buffer. On the other hand, a change from on to off is not aged, but is used immediately.

The output of our aging buffer or FIFO buffer is what we will term the direct message. The direct message is one of the words which is transmitted and is used at the receiver or decoder, and is also used as the encoder as follows.

The vital test words are selected so that the vital state words are part of a linearly independent set of words. Combining any number of these words by a linear process produces results that are unique for all combinations of inputs.

Selected vital state words (those representing input lines that are in their on state) are exclusively OR'ed with each other to produce a group check word. As a result, there is a unique group check word for every different state combination of input line states in a given group. Only those vital state words that correspond to "on" input lines reflected in the direct message are used in this exclusive OR'ing process. The remaining words are not used.

If we have more than one group in a system, we develop a group check word for each group. Each of the group check words is combined via the same linear process to produce the check word.

We select our vital state words so that 8 words from the linearly independent family are reserved for forming system ID words. These words can be combined in groups 1, 2, 3 or 4 words to produce 8, 28, 56 or 70 different system ID words. (8, 28, 56 or 70 is the number of different combinations of 8 things taken 1, 2, 3 or 4 at a time.) The resulting system ID words are exclusively OR'ed with the check word to produce a system check word.

The input sensing and encoding process just described is repeated for every message frame. The vital driver 32 (at the receiving location) will sustain the outputs only if valid messages are received within a time limit imposed by the vital driver 32 in a manner which will be explained.

The direct message (made up of the master direct word for each group) and the system check word is formatted with a start of frame word and transmitted to the receiving location.

FIG. 2 shows a single bus 204 carrying the vital and direct test words to the sense circuits, connecting the bit reordering output to the transposer input, and connecting the transposer output to the processor input, however that is not essential, although convenient. It is within the scope of the invention to use a different, dedicated bus, for some or all of these functions.

Figure 7:
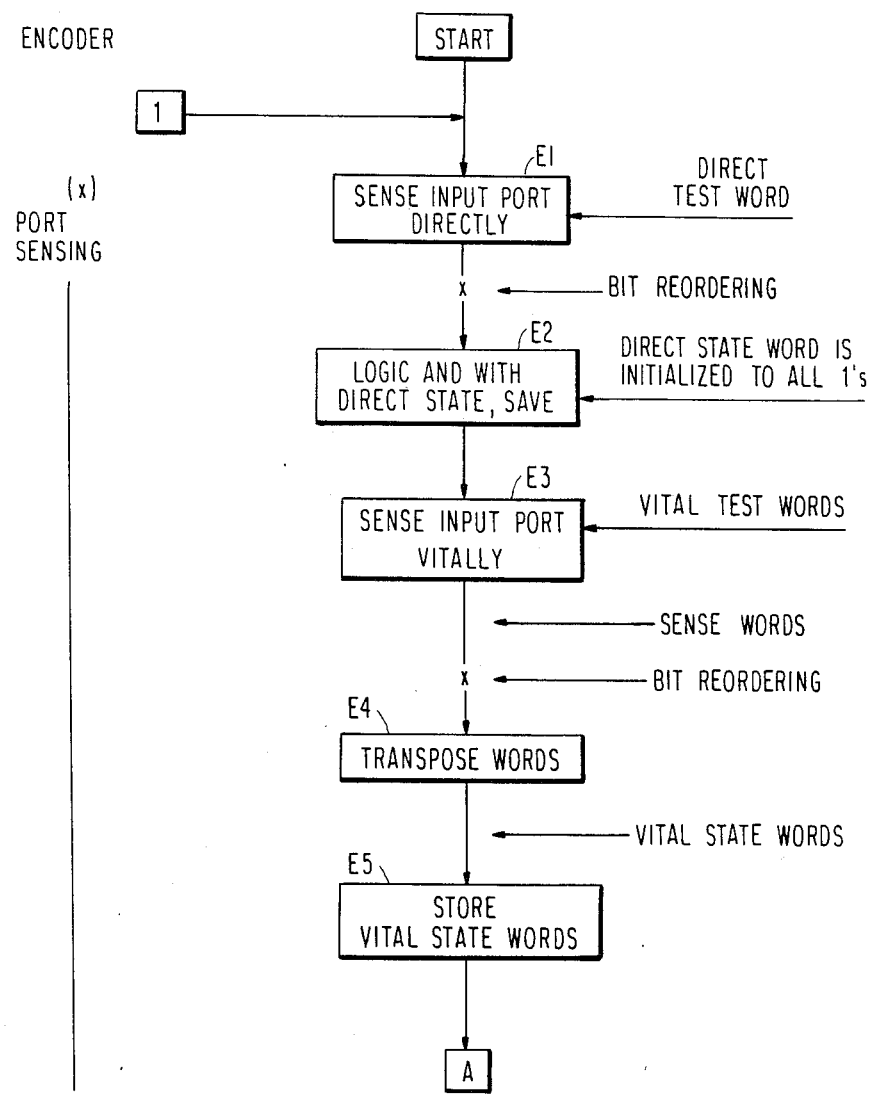
FIGS. 7–9 describe, in flow chart form, encoder processing.
Figure 8:
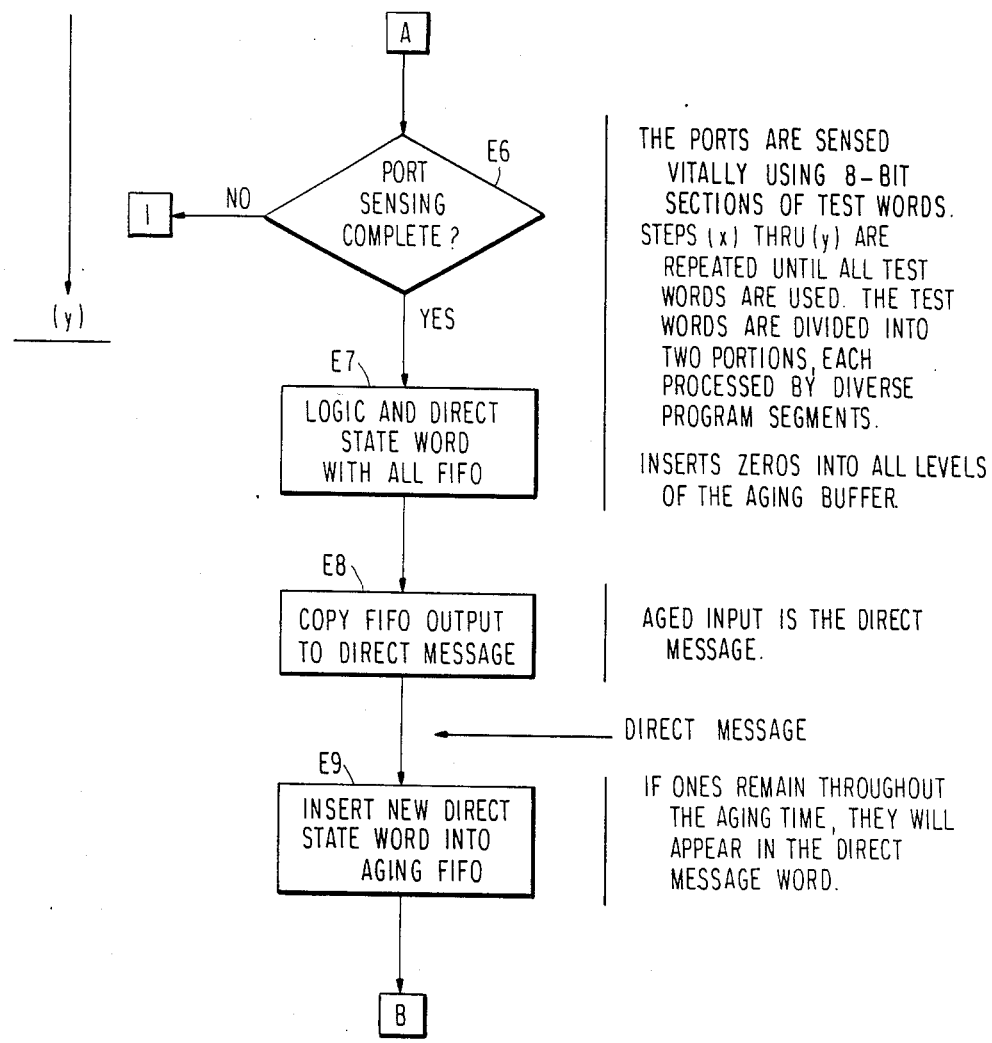
Figure 9:
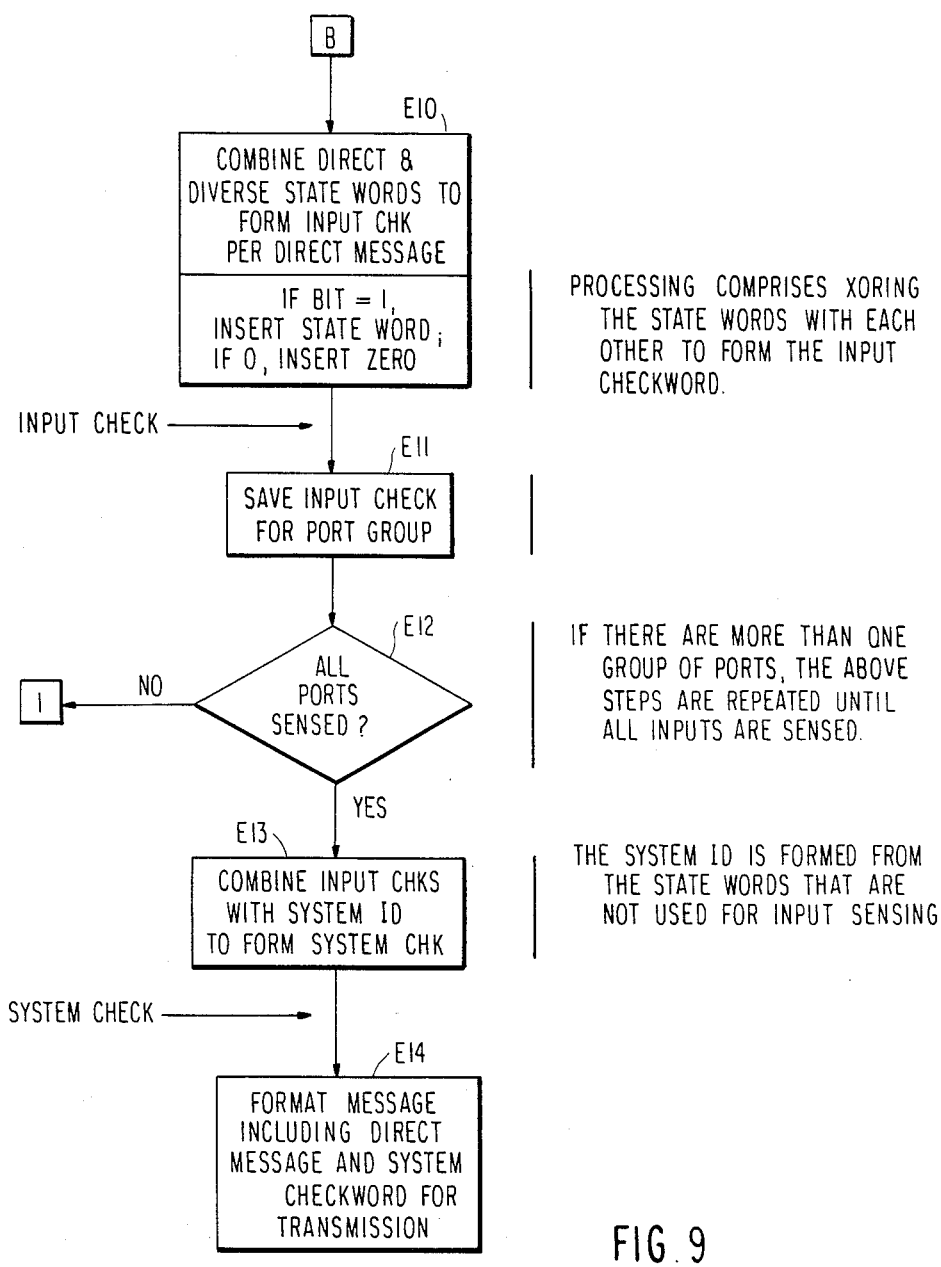

The processing effected by the processor 205 is shown in FIGS. 7–9.

Figure 14:
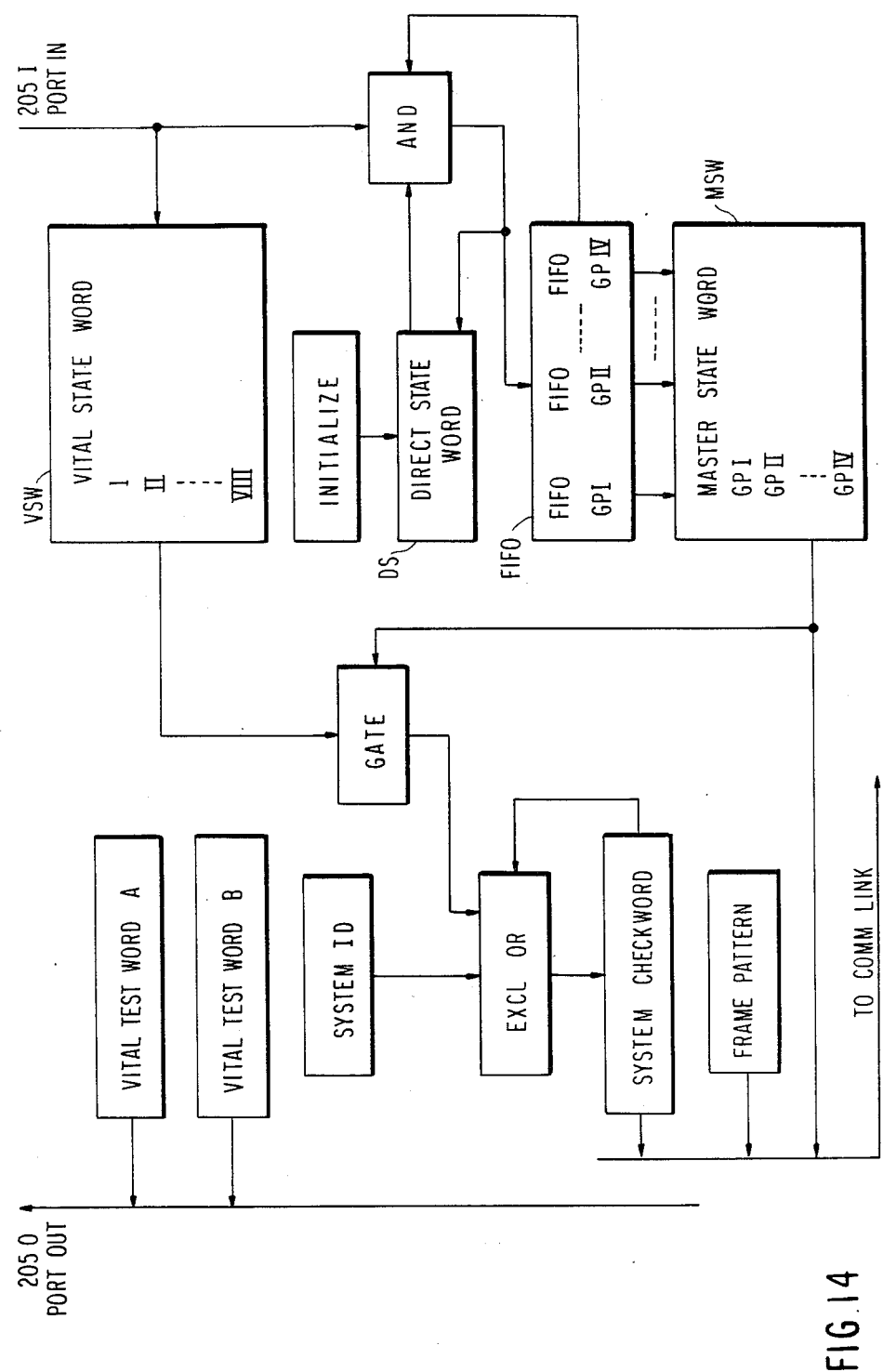
FIG. 14 shows the data flow at the encoder.

Before describing the processing detail, reference is made to FIG. 14 to illustrate the data path in the processor 205. FIG. 14 shows the output port 205O, the input port 205I and the output to the communication link. Internal to the processor 205 are a plurality of storage locations holding the vital test words included vital test word A and vital test word B. This represents a distribution of the vital test words which, as will be described, are accessed by diverse program instructions. The diversity is provided for safety purposes and those skilled in the art will understand that use of only two storage sections and only two program segments is not essential, more sections and segments can also be used. As vital test words are applied to the bus 204, vital state words are produced and these are coupled from the port 205I to a temporary location VSW, including a location for each different vital state word in a group. These locations are loaded, eight bits at a time sequentially. The processing is repeated a number of times so that the vital state word (consisting of at least 32 bits) is loaded for each input line in a group. As will be described, interspersed with the vital state word derivation is direct testing which produces direct state words at the input port 205I. Direct state words are coupled directly to an AND gate, where they are AND'ed with the previous contents of DIRECT STATE (or register DS). DIRECT STATE is, prior to sensing of each group, initialized to all ones. A FIFO buffer is also provided which includes a number of levels for each group. After the vital sensing of any particular group is completed, each level of that group's section in the FIFO is AND'ed with the direct state word. Immediately, the "oldest" section of the FIFO is copied into a master state word register MSW, which includes a location for each group. Thereafter, each level of the FIFO buffer for that group is moved up one section and the contents of the direct state word register DS is copied into the "newest" section of the FIFO buffer for that group.

After sensing of a group is completed, a group check word is formed by gating selected vital state words for the group, from VSW, to an exclusive OR gate. The gating is under control of the master state word for that group and consists of allowing only vital state words corresponding to a one bit in the master state word to be passed to the exclusive OR gate. The result is a partial system check word which is located in the system check word register. This process is repeated for the next group except that the contents of the system check word register also form an input to the exclusive OR gate. After all groups have been processed, the result is exclusively OR'ed with the system ID to produce the system check word. The message is then formatted to consist of a frame pattern, a master state word from each group and the system check word. The formatted message is passed to the communication link for transmission.

Referring to FIG. 7, the processing effected by the processor 205 is shown in flow chart fashion. Function E1 senses the input ports directly, e.g. using a direct test word. The processor reads back the response which is logically AND'ed with DIRECT STATE and the result is saved. The parameter DIRECT STATE is initialized before direct sensing of each group to be all one's, and so long as each input line remains in the "on" condition, each time functions E1 and E2 are performed, the corresponding bit remains 1. If, however, during this process at any time, the corresponding input line goes "off", then the corresponding bit will go to zero, and will remain at zero until the parameter DIRECT STATE is again initialized.

Thereafter, function E3 senses the input port vitally using several vital test words. The resulting sense words are re-ordered (element 202) and are input to the transpose element 203. Function E4 effects transposition by raising the control line to the transpose element 203.

The result is a vital state word which is read by the processor 205 and stored at function E5. Thereafter, function E6 determines if port sensing is complete. In the example described, since we are sensing the ports with 8-bit vital test words, and since our desired vital state word is a multiple of 8 bits, then we must use a plurality of vital test words, and until this has been effected, port sensing is not complete. Thus, processing loops back to function E1 again. The loop of functions E1-E6 is effected until port sensing is complete. Note that each time the loop is traversed, we do another direct sensing operation and produce another direct state word which is AND'ed with the prior direct state word.

The processor 205 maintains an aging buffer or FIFO. The FIFO has a number of stages, depending on the desired delay time and the rate at which the program is executed. Function E7 performs a logical AND between the direct state word which is produced by the loop of functions E1-E6, with every level of the FIFO. To the extent that a direct state word has a one in any bit position, this logical AND'ing has no effect on the FIFO. On the other hand, if a direct state word has a zero in any bit position, that zero is written into every level of the FIFO at the corresponding bit position.

Thereafter, function E8 copies the output of the FIFO to storage location DIRECT MESSAGE or MSW (for the master state word).

Function E9 inserts the direct state word (the result of loop E1-E6) into the aging FIFO, and thus the FIFO output (which is copied at function E8) is discarded and all levels of the buffer move up one level. If a one remains in any bit position in the FIFO as the direct state word is aged, it will appear in the direct message. If, however, during the time a direct message is "aged" any bit position becomes a zero, then the zero remains in the direct message. The direct message, therefore, contains a one in any bit position corresponding to an input line if the line remained "on" throughout the time the message proceded through the FIFO, and otherwise has a zero in the corresponding bit position.

Function E10 effects an exclusive OR operation for selected ones of the vital state words (which has been derived in segments, each segment has been stored at function E5). We examine the direct message, each different bit position in the direct message corresponds to a different vital state word. If the direct message contans a one, then the corresponding vital state word is selected. If the direct message contains a zero, then the corresponding vital state word is ignored. We then exclusive OR all the vital state words that we have selected and this produces a group check word. Function E11 saves the group check word. At this point, we have a direct message and a group check word for a single group. Function E12 determines if groups have been sensed. If not, we repeat the loop of functions E1-E11 just described, for each other group. This produces a direct message and a group check word for each group.

Once that has been concluded, function E13 combines (in an exclusive OR sense) each of our group check words with the system ID to form a system check word. We now have a direct message for each group, and one system check word. Function E13 then formats our message incuding the direct message (for each group) and the system check word and outputs it to the communication link for transmission.

THE RECEIVING LOCATION

FIG. 3 shows the apparatus at a typical receiving location, so as to particularly show the decoder 34 in more detail than is shown in FIG. 1. More particularly, the decoder 34 includes a processor 305 (which may be a microprocessor). The processor 305 is responsive to information received from the communication link at an input port $IN_2$. The processor 305 has, in addition, additional input ports $IN_1$, and output ports $OUT_1$, $OUT_2$ and $OUT_3$. The latter provides a signal on the path 36 to the VRD 32. Of course, the primary purpose for the processor 305 is to receive the information from the communication link defining the desired status of the various output bit locations. This information is communicated to the various locations from $OUT_1$ through a bit re-ordering element 306, and then to the output element 301. Output element 301 includes a different circuit 301-1 through 301-8 for each output bit position. This output circuit includes a control input c, a drive inout d, and two outputs. A first output o which is connected to the associated relay coil, and a sense output s coupled to another bit re-ordering element 302. In addition to coupling the output bit potential (from the input c to the output o), each circuit includes an absense of current detector (AOCD) which is described more completely in the co-pending application of Hoelscher, filed on Nov. 10, 1983, Ser. No. 550,430. Briefly, the absence of current detector responds to two inputs, the input at the control terminal c and the driving input at the drive terminal d, to produce a sense output at the s terminal. The characteristic of the AOCD is the complement of the input sensing circuit. Accordingly, if the output is off (for example a high potential at the input c and at the output o), then the bit pattern produced at the sense output terminal 2 is the inversion of the bit pattern applied to the drive input terminal d. That is, if the particular output is off, then a 101 pattern applied at the d terminal produces a 010 pattern at the sense teminal s. On the other hand, if the output bit position is on (for example a low potential at the input terminal c and the output terminal o), then the output at sense terminal s is a null bit pattern regardless of the bit pattern applied at the drive terminal d.

The bit re-ordering elements 306 and 302 perform functions similar to the function performed by the bit re-ordering element 202 (see FIG. 2). The output of the bit reordering element 302 is applied to a multi-conductor bus 304, with at least one conductor in the bus for each relay coil or output bit position in a group. A transpose element 303 is provided to effect a function similar to that disclosed for the transpose element 203 in the encoder (see FIG. 2). The output of the transpose element 303 is placed back on the multi-conductor bus 304 which forms the input to the processor 305's input port $IN_1$.

As will become clear hereinafter, the direct portion of the message directly controls the output port $OUT_1$ on a bit by bit basis, e.g. there is one bit position in the output port $OUT_1$ for each bit in the direct message. In addition to controlling the port $OUT_1$ from the direct message, the processor also, at times, drives the drive terminals d of the circuits 301-1 through 301-8 via the output port $OUT_2$. This driving provides for a vital sensing operation similar to the vital sensing effected at the encoder 20. For vital sensing, the sensed bit pattern is first re-ordered through the bit re-ordering element 302, transposed through the transpose element 303 into vital state words which are then accepted by the processor 305 at the port IN₁.

As a result of the vital sensing, the processor 305, in combination with the received message, derives one or more check words. These check words are placed on the path 36 to the VRD 32. The VRD 32, in response to a sequence of check words, applies a signal on the path 38. In the presence of an appropriate set of check words produced at an appropriate rate, an appropriate signal will be placed on the path 38 to enable the tuned vital driver 40 to provide power to the relay coils VR1-VRn, so that those coils coupled to an "on" output bit position, will be energized. If, on the other hand, as will be described below, the check words received at the VRD 32 do not exhibit the appropriate content and/or rate, then the signal produced by the VRD 32 will not be accepted by the tuned vital driver and power will not be applied to any of the relay coils.

As described in the copending Sibley application filed Nov. 10, 1983, one embodiment of the invention employed a modulated square wave of selected duty cycle, carrier frequency and modulation rate as the signal required by the tuned vital driver 40.

FIG. 3, like FIG. 2, shows a single bus 304 performing multiple functions. Particularly, the bus 304 is connecting the output of bit reorder element 302 to transposer 303 and connecting the output of transposer 303 to the processor input. It is within the scope of the invention to use a different dedicated bus for either of these functions.

Figure 10:
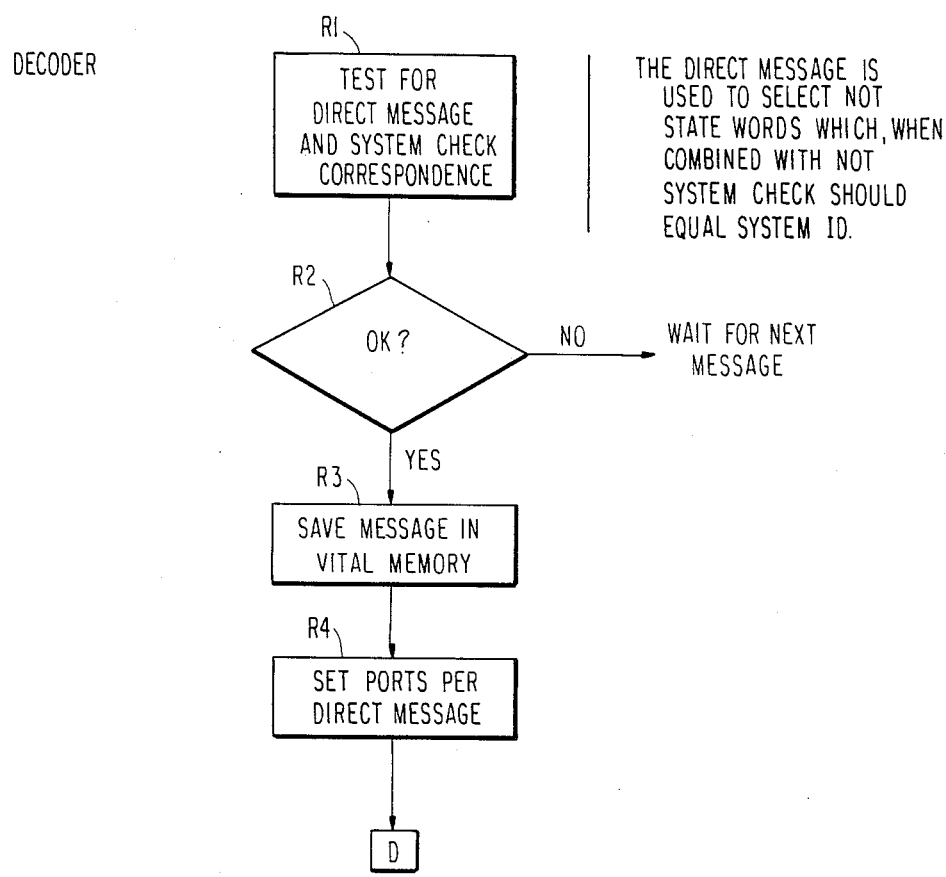
FIGS. 10–12 describe, in flow chart form, decoder processing.
Figure 11:
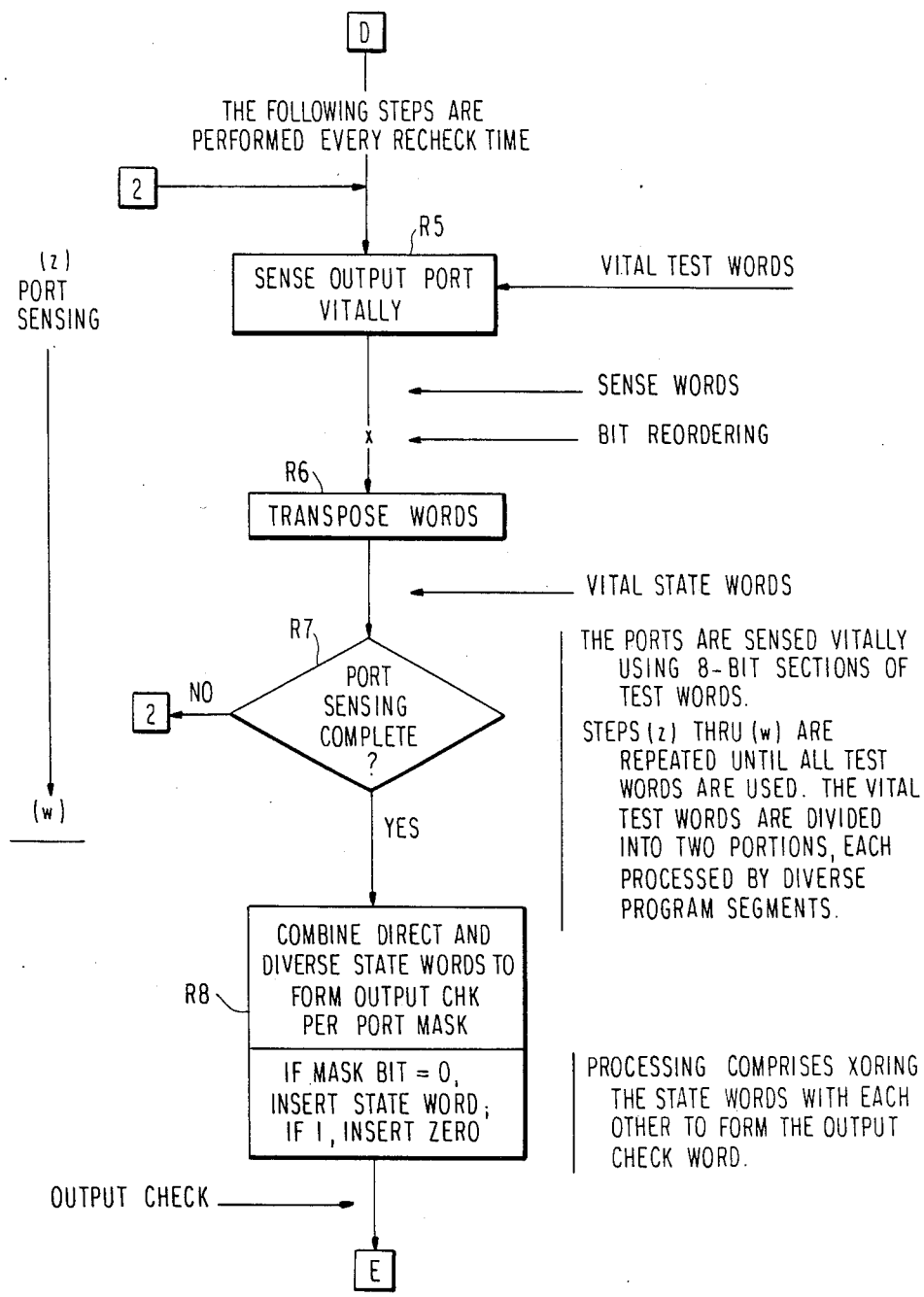
Figure 12:
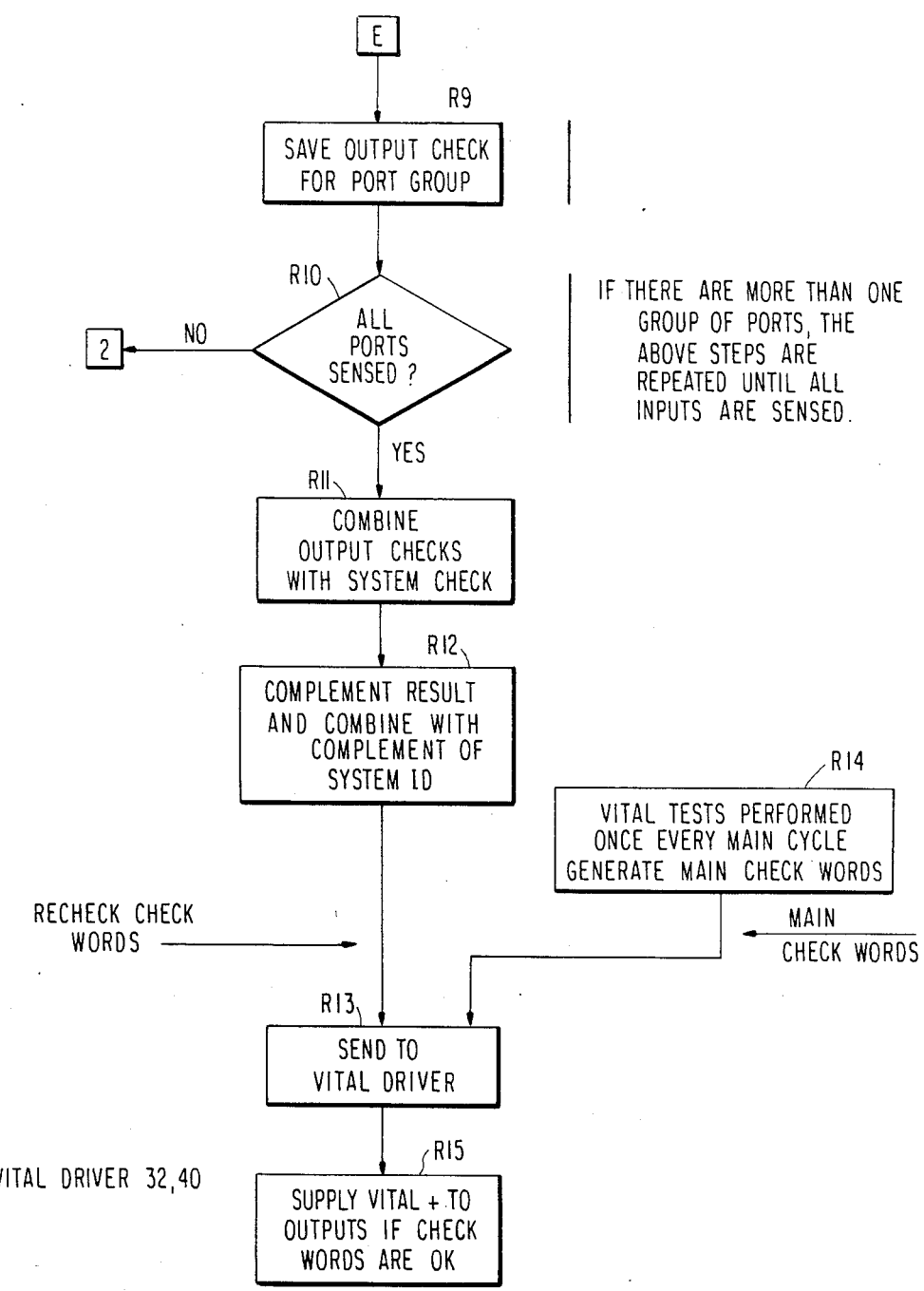

The processing effected by the processor 305 is flow charted in FIGS. 10–12.

Figure 13:
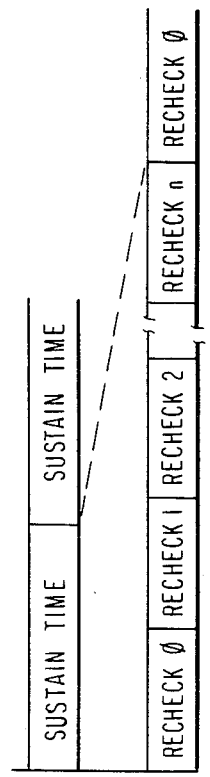
FIG. 13 shows the time relationship of the sustain time and recheck time.

Before referring to these flow charts, refer to FIG. 13 which illustrates a time hierarchy of a sustain time, a recheck time, and a modulation state. As is described in the co-pending Sibley application filed Nov. 10, 1983 Ser. No. 550,431, it may not be physically possible for a suitable processor (for example a microprocessor) to effect the necessary functions required for decoding the received message, setting the output, and checking the output for accuracy at a sufficiently rapid rate to ensure that a failure will be detected before an output relay can change state. Typical pick time for a vital relay is 150 milliseconds. In order to solve this problem, we arrange operations in a cyclical order. We divide the processing so that the outputs are checked at a sufficiently rapid rate (at least for example once every 100 milliseconds or less) to ensure that we can detect an output failure before a relay will change state. However, we recognize that we cannot necessarily receive a message, decode it and perform all the other necessary functions within this period of time. Accordingly, we arrange for each message to be effective for a sustain time, and the sustain time is selected as a suitable interval, e.g. 1 second within which the necessary processing can be completed. The various time limits are inposed by the VRD 32 by requiring that unless suitable check words are received at the suitable rate, the VRD 32 will not provide the necessary output to the vital driver 40. Reference can be had to the co-pending Sibley application filed Nov. 10, 1983 for an example of the processing effected by the VRD 32. The presence of the VRD 32 imposes certain requirements on the decoder processor 305 in addition to merely decoding the direct message and controlling the positions of OUT₁. More particularly, the processor 305 must, in addition, formulate suitable check words to firstly, authorize the initiation of a sustain time at the VRD (consisting of a given plurality of recheck times) and secondly, provide a suitable sequence of check words to individually authorize each recheck time. The recheck time authorization is only produced if the output is checked at the appropriate rate. Accordingly, processing at the processor 305 is broken down into main cycle processing, which controls the output. This processing is accomplished at least once per sustain time (for example once per second). In addition, checking the output ports is accomplished at the more frequent interval of a recheck time to produce the necessary recheck check words to authorize the VRD 32 to maintain its output for each additional recheck time.

Figure 15:
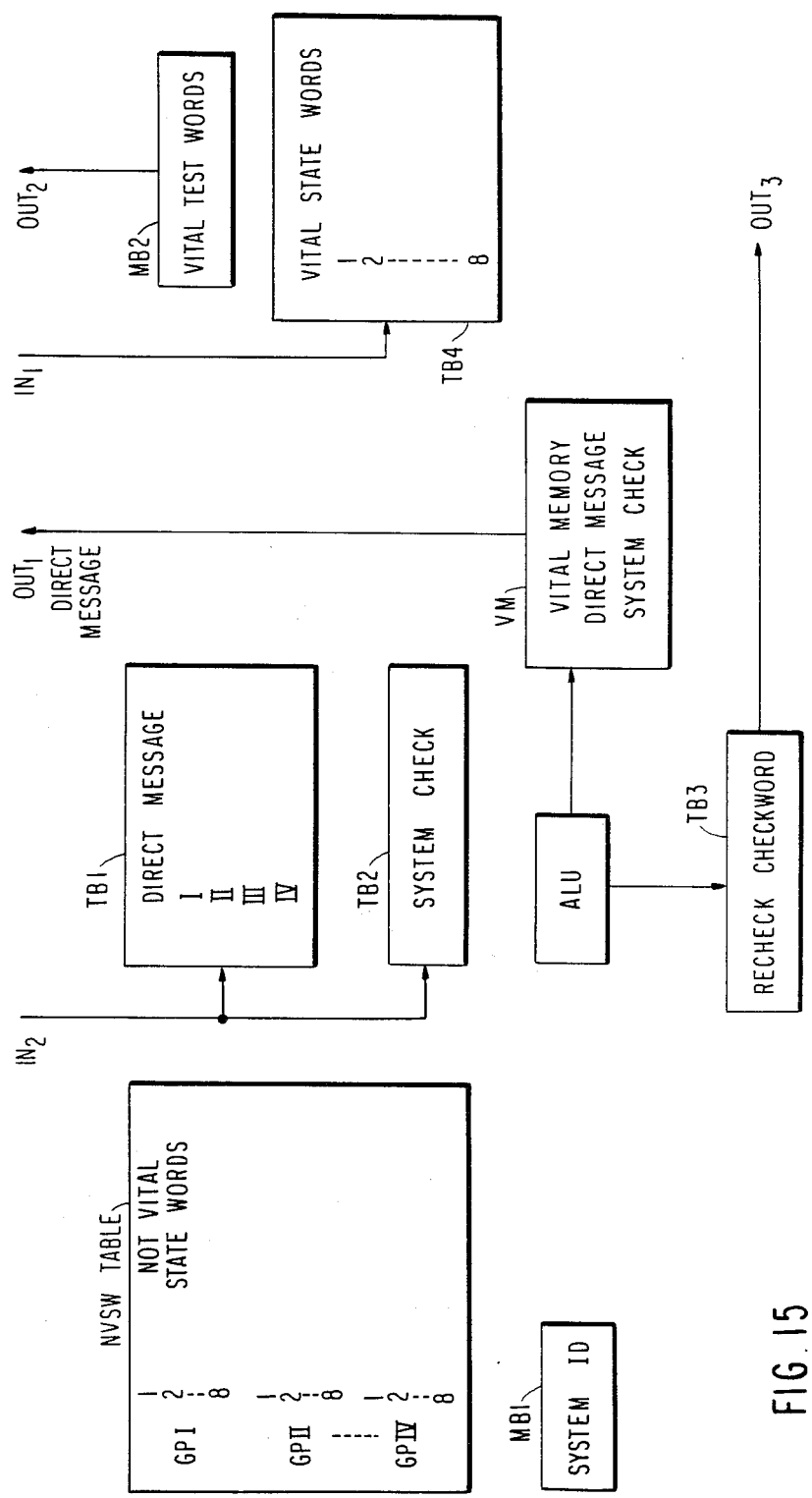
FIG. 15 shows the data flow at the decoder.

FIG. 15 illustrates the data flow in the processor 305. More particularly, the processor 305 includes a NVSW table (not vital state words) wherein are stored the complement of the vital state words for each output bit position in each of up to four groups. As a message is received, it is stored in a temporary buffer, the direct message is stored in TB1, and the associated system check is stored in TB2. As is by now clear, the direct message may include up to four direct message words, one for each of up to four groups. An ALU performs a checking operation (described below) on the contents of TB1 and TB2 to ensure correspondence. If the check is passed, the ALU writes the information to a vital memory which therefore includes a direct message segment and a system check segment. The vital memory then can output the direct message for setting each of the output bits to correspond to the different bit positions in the direct message. In the course of this checking operation, the ALU also uses the system ID obtained from the MB1. As part of the recheck processing, which will be described below, the output ports are vitally sensed using vital test words from MB2. The vital sensing results in vital state words which are stored in a temporary buffer TB4. The ALU then processes this information and derives a recheck check word, which is output via a temporary buffer TB3.

Referring now to FIG. 10, functions R1-R4 are effected once per main cycle. After the direct message and the system check word is received and stored function R1 tests this information for correspondence. More particularly, the direct message, it will be recalled, includes a bit position for each output bit and as explained in connection with the encoder 20, the system check has a unique correspondence with the direct message. Associated with each bit position in the direct message is a vital state word. We examine each bit position in the direct message, and select the complement of the vital state words associated with each one, thus we select the complement of the vital state words which were used at the encoder. These words are selected from a stored table based on the one bits of the direct message. The selected NON STATE words are exclusively OR'ed together and then are exclusively OR'ed with the complement of the system check word. We will call the result the computed ID, for if no errors occurred, the computed ID should be identical to the system ID used at the encoder. Function R2 compares the result of function R1 (the computed ID) with the actual system ID (which may be accessed from storage). If the comparison is an equality, then processing continues, otherwise a wait loop may be entered to wait for the next message. The latter event signals the lack of correspondence between the direct message and the system check which invalidates the message. While function R2 could be implemented as a mere comparison, other steps could be substituted to produce the same effect. The actual system ID and the computed system ID could be arithmetically combined (exclusively OR'ed AND'ed, added, subtracted, etc.) to produce a result which could be used (either directly or when modified with a base address) as a branch to a program segment. If the actual system ID matched the computed system ID, then the branch would be to an appropriate location, e.g. function R3, otherwise the system would enter a wait loop or the like.

Assuming that the actual system ID matched the computed system ID, function R3 is performed to save the message in vital memory. Vital memory has connotations which are more completely described in Sibley co-pending application Ser. No. 241,819 filed Mar. 9, 1981. At the very least though, the vital memory includes a storage function. Function R4 copies the status of the direct message to the output ports $OUT_1$.

That completes the substantive processing effected each main cycle. In addition to the substantive processing which is illustrated in FIG. 10, additional processing to ensure the vitalness of the processing are added, such techniques are described in the above-mentioned co-pending applications. The referred to techniques result in the production of main check words which are transmitted to the vital driver 32 at the conclusion of function R4.

FIGS. 11 and 12 illustrate the recheck processing effected each recheck time, and necessarily the functions shown in FIGS. 11 and 12 are effected many times in each main cycle. Referring now to FIG. 11, function R5 vitally senses the output ports. This involves the presentation of vital test words (bit parallel, word serial at $OUT_2$), the production of resulting sense pattern (from the output terminals s of the AOCD's 301-1 through 301-8), the re-ordering of those bits through the re-order element 302, the transposition of those bit patterns through the transpose element 303, into the resulting vital state words. Thus function R6 merely requires enablement of the transpose element 303, the actual transposition being effected in the hardware included in that element. Function R7 determines if port sensing is complete. This at least requires the use of several, time sequential vital test words and assuming port sensing is not yet complete, the processing loops back to function R5 for additional port sensing. At the conclusion of a sufficient number of iterations of functions R5–R7, to complete vital sensing, then function R8 is performed. The preceding processing has resulted in the storage of vital state words.

Function R8 produces an output check word similar to the manner in which the group check word is produced at the encoder. More particularly, reference is made to a port mask repeating the state of the output, bit by bit. For any bit position in which the mask contans a zero, the state word for that bit position is selected, on the other hand, for any bit position in which the mask indicates a one, nothing is selected. All selected state words are exclusively OR'ed to form an output check word. Since zero bits in the direct message or port mask designate off outputs, this process selects those vital state words not used in the encoding.

Once the output check word is produced by function R8, function R9 stores the output check word for this particular group. Function R10 determines if all ports have been sensed, e.g. are there any further groups? If there are, processing loops back and repeats functions R5–R7 to generate an additional check word which is then stored at function R9. This processing continues until all groups or ports have been sensed.

Function R11 combines all the output words with system check. System check is the check word received along with the direct message. System check of course has been produced by linearly combining vital state words of "on" inputs. The decoder check word, as described above, is produced by linearly combining vital state words of "off" outputs. By design, then, the result of R11 is made up of a linear combination of all vital state words, regardless of the direct message. Function R12 then complements the result and combines it with the complement of system ID.

In the event of flawless processing, the result produced by function R12 will be constant for every system regardless of the system ID and/or the condition of any input line and/or output. On the other hand, if one of the outputs is actually on when it should be off, then its vital state word will not be included in the output check because the vital sensing of a port which is on is a null string. This circumstance will prevent the result at function R12 from being the constant, as will be described below, this will result in protective reaction by the VRD 32.

Accordingly, at the conclusion of each recheck time, function R12 produces a recheck check word, and each time such a check word is produced it is coupled to the VRD 32 via the path 36. So long as the recheck check words are received by the VRD 32 at the appropriate rate with the right content, the VRD 32 will produce a particular output which is necessary to maintain the tuned vital driver 40 in a permissive condition, e.g. supplying power to the vital relay coils.

Not specifically illustrated in FIGS. 11 and 12 is the presence of other, interspersed processing to ensure that the vital store, for example at function R5 and at R9, is not compromised. The techniques used to develop this processing are described in more detail in the prior co-pending applications referred to above. Similar processing is carried out during the main cycle, and referred to collectively as function R14. The techniques for developing this processing are also described in the co-pending applications, particular reference being made to the Rutherford application, filed Nov. 10, 1983, Ser. No. 550,693.

Function R13 completes the processing effected at the decoder. Function R15 is actually carried out by the VRD 32 and the tuned vital driver 40.

We claim:

1. A method of sensing the binary condition of plural input lines comprising the steps of:
   (a) providing a number of sense circuits equal in number to the number of input lines, each said sense circuit having an input terminal connected to a corresponding input line, a drive input and a sense output, said sense circuit having the characteristic of producing, at said sense output, a signal related to said drive input if said input line is in one binary condition or otherwise producing a null signal at said sense output regardless of the condition of said drive input,
   (b) providing a multi-conductor bus for providing said drive input, with a conductor for each sense circuit in a group of sense circuits,
   (c) connecting conductors of said bus to drive inputs of different sense circuits of said group and connecting said sense outputs of different sense circuits of said group to conductors of said bus, (d) providing a controllable transposer for transposing bit parallel, word serial, words received from said bus to place bit serial, word parallel words on said bus, (e) placing a time sequence of bit parallel, word serial, vital test words on said bus and enabling said transposer to produce a time sequence of vital state words on said bus, each said vital state word representing the binary condition of a different one of said input lines, storing said vital state words derived from said bus, (f) placing at least one direct test word on said bus to produce at least one direct state word on said bus, storing said direct state word from said bus, and (g) using said vital and direct state words to determine the binary condition of said input lines.

2. The method of claim 1 in which said step (f) includes placing at least two direct test words on said bus to produce at least two direct state words, where said two direct test words are placed on said bus at times unique with respect to each other and with respect to any vital test word.

3. The method of claim 2 in which said step (g) comprises the steps of:
(i) linearly combining all said direct state words to produce a master state word and,
(ii) using said vital state words with said master state word to determine the binary condition of said input lines.

4. The method of claim 1 which conductors of said bus are connected to corresponding drive inputs and said sense outputs are connected to conductors of said bus in a different order.

5. The method of claim 1 in which conductors of said bus are connected to corresponding sense outputs and drive inputs are connected to bus conductors in a different order.

6. A system for sensing the binary condition of plural input lines comprising:
(a) a plurality of sense circuits, equal in number to the number of input lines, each sense circuit including an input terminal connected to a corresponding input line, a drive terminal, a sense output terminal, means for producing, at said sense output terminal a signal related to a signal at said drive terminal if said input line is in one binary condition and for otherwise producing a null sense output regardless of the drive input,
(b) a multi-conductor bus with at least a separate conductor for each input line in a group of input lines,
(c) first connector means for connecting conductors of said bus to different drive terminals of said sense circuits and second connector means for connecting conductors of said bus to different sense output terminals of said sense circuits,
(d) transposing means for transposing a time sequence of bit parallel, word serial, words on said bus to place a time sequence of bit serial, word parallel words on said bus,
(e) processor means for writing a time sequence of vital and direct test words to aid bus and for controlling said transposing means to operate only in response to said vital test words, and including means responsive to resulting vital state and direct state words to determine the state of said group of input lines.

7. The system of claim 6 in which said first connector means connects conductors of said bus to corresponding drive input terminals and said second connector means connects conductors of said bus to sense output terminals in a different order.

8. The system of claim 6 in which said second connector means connects conductors of said bus to corresponding sense output terminals and said first connector means connects conductors of said bus to drive input terminals in a different order.

9. The system of claim 6 in which said processor means writes at least two direct test words, all said direct and vital test words written to said bus at times unique with respect to all other direct and vital test words.

10. The system of claim 6 in which said processor includes means to linearly combine all direct state words to produce a master state word.

11. The system of claim 6 in which said processor means includes:
(i) means to store said direct state words,
(ii) means to store said vital state words,
(iii) said means to store said direct state words including an aging buffer to delay a direct state word for a delay time.

12. The system of claim 11 in which said processor means includes:
(iv) means, responsive to direct state words stored in said means to store direct state words, for linearly combining all said direct state words to produce a master direct state word.

13. The system of claim 12 in which said processor means includes means to linearly combine selected vital state words as determined by said master state word.

14. A method of encoding the binary state of a plurality of input lines comprising the steps of:
(a) storing a master state word with a bit dedicated to and representing the state of each of said input lines,
(b) providing a unique multi-bit value for each of said input lines,
(c) linearly combining a multi-bit value for an input line in a given state with the multi-bit value for each other input line in said given state to form a check word, and
(d) storing said check word and concatenating said master state word and said check word to represent the state of said input lines.

15. The method of claim 14 in which step (c) is an exclusive OR operation.

16. The method of claim 14 in which said step (b) comprises:
(i) providing each said input line with a sense circuit having one terminal coupled to said input line, a drive terminal and a sense terminal, said sense circuit having the characteristic of inverting a signal at said drive terminal to produce a signal at said sense terminal in the event the associated input line is in one binary condition or otherwise presenting a null signal at said sense terminal regardless of the condition of said drive terminal,
(ii) driving plural sense circuits, in parallel with plural vital test words to develop a multi-bit value for each input line in said one binary condition, and
(iii) storing all said multi-bit values.

17. The method of claim 16 in which said step (ii) includes the step of:

(iv) storing, for each vital test word a resulting single bit associated with each input line, and after storing plural bits, transposing said stored bits to produce said multi-bit values.

18. The method of claim 14 in which said step (a) comprises the steps of:
(i) providing each said input line with a sense circuit having one terminal coupled to said input line, a drive terminal and a sense terminal, said sense circuit having the characteristic of inverting a signal at said drive terminal to produce a signal at said sense terminal in the event the associated input line is in one binary condition or otherwise presenting a null signal at said sense terminal regardless of the condition of said drive terminal, and
(ii) driving said drive terminals, in parallel, with an all zero word to produce a direct state word with a given value in each bit position corresponding to an input line in one binary condition.

19. The method of claim 18 in which said steps (i) and (ii) are repeated plural times to produce plural direct state words and said master state word is produced by AND'ing all said direct state words.

20. The method of claim 18 which further includes:
(iii) storing said direct state word,
(iv) providing a FIFO buffer with plural sections,
(v) initializing said FIFO buffer with an all zero word in each section,
(vi) AND'ing said direct state word with all sections of said FIFO buffer to immediately write a zero into every section of said FIFO buffer corresponding to every zero in said direct state word,
(vii) shifting each section of said FIFO buffer, writing said direct state word to the lowest section of said buffer and selecting the highest section of said FIFO buffer as said master state word.

21. The method of claim 14 in which said step (d) further includes the steps of:
(e) providing one or more system ID words, identifying a unique group of said plurality of input lines,
(f) linearly combining all said system ID words with said check word to produce a system check word, and
(g) concatenating said system check word and said master state word to represent the state of said input lines.

22. The method of claim 14 in which said plurality of input lines consist of a number of groups of input lines, each group having an equal number of input lines in which said step (a) is accomplished for each of said groups to produce a number of master state words equal to the number of said groups, and said step (d) uses all of said master state words.

23. A method of communicating the state of a plurality of input lines comprising the steps of:
(a) storing a direct state word with a bit dedicated to and representing the state of each of said input lines,
(b) providing a unique multi-bit value for each of said input lines,
(c) linearly combining a multi-bit value for an input line in a given state with the multi-bit value for each other input line in said given state to form a check word, and
(d) transmitting a representation of said direct state word and said check word to represent the state of said input lines,
(e) testing a received representation for correspondence by:
(i) linearly combining a complement of multi-bit representations which represents an input line in said given state with complements of the multi-bit representations for each other input line in said given state,
(ii) linearly combining the result of step (i) with the complement of said check word representation,
(iii) comparing the result of step (ii) with a predetermined word and allowing further processing if said comparison is an equality, and
(iv) using said representation of said direct word to represent the communicated state of said plurality of input lines.

24. The method of claim 23 in which said steps (c), (e) (i) and (e) (ii) are each an exclusive OR operation.

25. The method of claim 23 which includes the further steps of:
(ci) subsequent to step (c) but prior to step (d) linearly combining a system ID word with said check word to produce a system check word,
wherein said representation of said check word which is transmitted is said system check word,
and wherein said predetermined word is said system ID.

26. A method of communicating the state of a plurality of input lines comprising the steps of:
(a) storing a direct state word with a bit dedicated to and representing the state of each of said input lines,
(b) providing a unique multi-bit value for each of said input lines,
(c) linearly combining a multi-bit value for an input line in a given state with the multi-bit value for each other input line in said given state to form a check word, and
(d) transmitting a representation of said direct state word and said check word to represent the state of said input lines,
(e) using a received direct state word to control a plurality of output lines,
(f) testing that step (e) is correctly performed by:
(i) linearly combining a multibit value for any output line not in said given state with a multibit value for each other output line not in said given state to produce an output check word,
(ii) linearly combining said output check word with said check word of step (c) to produce a constant value irrespective of the particular state of said input and output lines so long as corresponding input lines and output lines are in an identical state.

27. The method of claim 26 wherein said linear combining of steps (c), (f) (i) and (f) (ii) are each an exclusive OR function.

* * * * *